No. 729,546. Patented June 2, 1903.

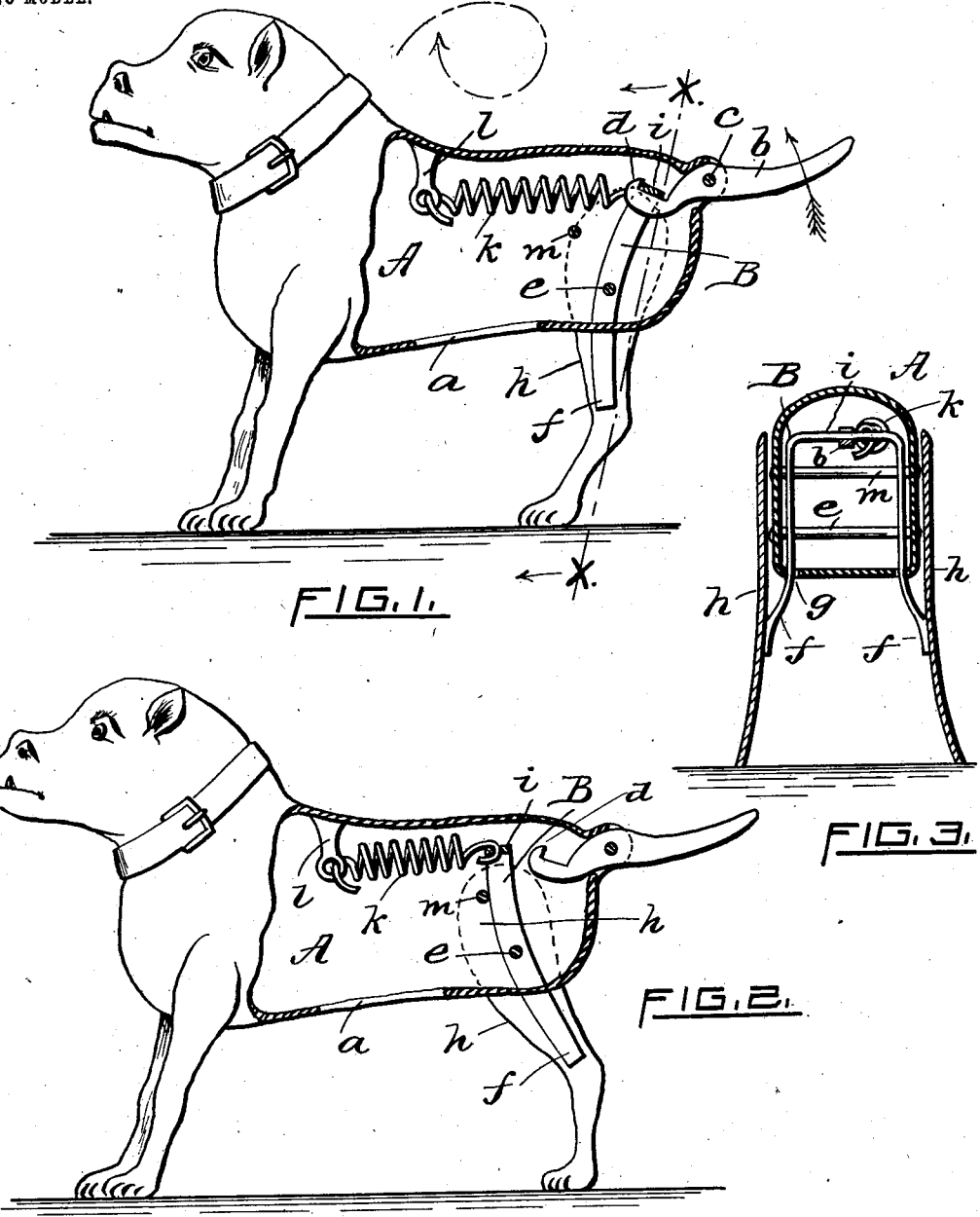

UNITED STATES PATENT OFFICE.

ELBERT V. CLARK, OF PROVIDENCE, RHODE ISLAND.

TOY.

SPECIFICATION forming part of Letters Patent No. 729,546, dated June 2, 1903.

Application filed October 28, 1902. Serial No. 129,138. (No model.)

*To all whom it may concern:*

Be it known that I, ELBERT V. CLARK, a citizen of the United States, residing at Providence, in the county of Providence and State of Rhode Island, have invented certain new and useful Improvements in Toys, of which the following is a specification.

My invention relates to that class of toy animals whose movements are actuated by spring agency; and its purpose is to disclose an automatic means of inducing the animal to perform a back somersault and finally rest upon its feet.

To the above end my invention consists in the novel construction and arrangement of parts hereinafter described, and illustrated in the accompanying drawings, wherein—

Figure 1 is a side elevation of a toy dog embodying my invention, showing a portion of the side thereof broken away and the mechanism engaged; Fig. 2, a similar view of the same with the parts disengaged, and Fig. 3 a transverse section of the same on line $x\ x$ of Fig. 1.

Like letters of reference indicate like parts through the views.

The body portion A of the animal is preferably composed of thin sheet metal and forms a housing for the actuating mechanism, which is visually accessible through an opening $a$ in the body. The part representing the animal's tail constitutes a trigger $b$, pivoted to the rear extremity of the animal C, with a catch $d$ upon its inner end. A yoke-shaped or arched bar B is pivotally mounted in the interior of the animal upon a transverse bar $e$, and its extremities $f$, passing through openings $g$ in the lower portion of the body of the animal, are rigidly fixed to and parallel with the animal's hind legs $h$. To the arched or yoke portion $i$ of the bar B is fixed the end of a spring $k$, whose opposite end is fixed in any convenient manner to a projection $l$, directed inwardly from the animal's body at a point forward of the bar $i$. Diagonally above the bar $e$ is a second transverse bar $m$, spanning the interior of the body, and is designed as a stop to the forward travel of the bar B when the latter is released.

The operation of my toy is as follows: The parts are arranged in engaged position—that is, the catch $d$ of the trigger engages the portion $i$ of the bar B, as shown in Fig. 1. The animal is then held with its buttocks nearly touching the floor and in a nearly upright position. Then releasing the animal the end of the tail or trigger $b$ contacting with the floor produces a release of the bar B, and the animal executes a back somersault and alights upon its feet, with the parts in disengaged position, Fig. 2.

To engage the parts, the animal is held in one hand and with the other hand the hind legs are pushed forward until the bar B again engages the trigger or tail $b$.

Having thus described my invention, what I claim as new is—

1. In a toy animal, the combination with the body of a trigger adapted to engage a bar, of a bar engageable with said trigger and pivoted within the body, and spring means attached to said bar for actuating the latter, when the trigger is released.

2. In a toy animal, the combination with the body of a pivoted trigger, of a yoke-shaped bar engageable with the trigger and itself pivoted within the body, spring means attached to said yoke-shaped bar for actuating the latter when released from the trigger, and a stop adjacent said bar to limit the forward travel of the yoke-shaped bar.

3. In a toy animal the combination with a pivoted tail portion, of engaging means upon the inner end of said tail portion, leg members adjacent the body exterior, an arched transverse bar adapted to engage said engaging means and fixed to said leg members, pivotal means for said arched bar, and spring means for vibrating said bar.

In testimony whereof I have affixed my signature in presence of two witnesses.

ELBERT V. CLARK.

Witnesses:
HORATIO E. BELLOWS,
ROBERT L. STANTON.